United States Patent
LaGasse et al.

(10) Patent No.: US 10,630,391 B1
(45) Date of Patent: Apr. 21, 2020

(54) RF PROCESSING SYSTEM AND METHOD

(71) Applicant: MagiQ Technologies, Inc., Somerville, MA (US)

(72) Inventors: Michael LaGasse, Newton, MA (US); Alan Craig Beal, Stoneham, MA (US); Mark David Lucas, Chelmsford, MA (US)

(73) Assignee: MagiQ Technologies, Inc., Somerville, MA (US)

( * ) Notice: Subject to any disclaimer, the term of this patent is extended or adjusted under 35 U.S.C. 154(b) by 0 days.

(21) Appl. No.: 16/198,287

(22) Filed: Nov. 21, 2018

Related U.S. Application Data

(60) Provisional application No. 62/582,910, filed on Nov. 7, 2017.

(51) Int. Cl.
*H04B 10/50* (2013.01)
*H04B 10/548* (2013.01)
*H04B 10/2575* (2013.01)

(52) U.S. Cl.
CPC ... *H04B 10/50577* (2013.01); *H04B 10/2575* (2013.01); *H04B 10/50572* (2013.01); *H04B 10/548* (2013.01)

(58) Field of Classification Search
CPC .. B23K 26/032; B23K 26/0648; B23K 26/08; B23K 26/40; B23K 26/0665; B23K 26/046; B23K 26/082; B23K 2101/40; B23K 2103/548
See application file for complete search history.

(56) References Cited

U.S. PATENT DOCUMENTS

| | | | | |
|---|---|---|---|---|
| 6,580,532 B1 * | 6/2003 | Yao | ........................ | H03L 7/04 |
| | | | | 372/29.011 |
| 8,023,833 B2 * | 9/2011 | Malouin | ............... | H04B 10/671 |
| | | | | 356/450 |
| 9,338,041 B1 * | 5/2016 | Gerdes | .................. | H04J 11/004 |
| 9,338,042 B1 * | 5/2016 | Gerdes | .................. | H04L 27/122 |
| 9,546,915 B2 * | 1/2017 | Duncan | .................. | G01L 1/242 |
| 9,571,205 B1 * | 2/2017 | Suarez | ..................... | G02F 2/002 |
| 10,038,503 B2 * | 7/2018 | Lesea | ................. | H04B 10/2575 |
| 10,200,071 B1 * | 2/2019 | Pearce | ............... | H04B 7/18517 |
| 2002/0121890 A1 * | 9/2002 | Levitt | .................... | G01R 23/17 |
| | | | | 324/76.36 |
| 2011/0062127 A1 * | 3/2011 | Gu | ........................ | B23K 26/04 |
| | | | | 219/121.69 |
| 2014/0356003 A1 * | 12/2014 | Randel | ............... | H04B 10/6161 |
| | | | | 398/210 |
| 2016/0127049 A1 * | 5/2016 | Randel | ................. | H04J 11/0023 |
| | | | | 398/76 |
| 2016/0142153 A1 * | 5/2016 | Zamani | ............. | H04B 10/6161 |
| | | | | 398/202 |
| 2017/0170903 A1 * | 6/2017 | Jain | .................. | H04B 10/25752 |
| 2017/0201330 A1 * | 7/2017 | Zhou | .................... | H04B 10/697 |

\* cited by examiner

*Primary Examiner* — Mina M Shalaby

(57) ABSTRACT

RF processing systems and methods. An RF processing system includes an optical storage module, a processing module, and an electro-optical modulation module. The electro-optical modulation module is configured to receive the first signal from the optical storage module, receive the modulation signal from the processing module, and electro-optically modulate the first signal based on the modulation signal.

7 Claims, 12 Drawing Sheets

RF PROCESSING SYSTEM AND METHOD

TECHNICAL FIELD

Embodiments described herein generally relate to RF signal processing and, more particularly but not exclusively, to systems and methods for improving the dynamic range of RF receivers or digitizers.

BACKGROUND

Radio Frequency (RF) receivers have finite instantaneous dynamic range (IDR), which limits their ability to receive weak signals in the presence of strong signals. The weakest link in RF communications is typically the analog-to-digital converter (ADC). However, analog components such as amplifiers can limit performance as well. While automatic gain control (AGC) allows a system to operate at different input power levels, it does not improve the IDR.

Unchecked interference from strong signals may either de-sense the receiver or saturate it in ways that cannot be filtered or counteracted in digital post-processing. Beyond the blunt force AGC and front-end attenuation approach, more focused existing techniques for protecting RF receivers involve analog filtering at the front end. These analog filters are often configured as band-reject or notch filters. In addition active cancelers may also be used in cases in which a tap or a sample of the interference is available.

The modern electromagnetic (EM) environment is both dense and dynamic. This is particularly true for mobile platforms. In some applications, some form of EM spectral monitoring is paired with tunable or switched filters or blanking strategies. However, these existing techniques do not provide the optimal combination of fast tuning speed, low loss, linearity, spectral precision, and wide tuning range that is required in certain environments.

A need exists, therefore, for systems and methods for reducing interference in RF communications that overcome the shortcomings of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to an RF processing system. The system includes an optical storage module configured to receive, delay, and release a first signal; a processing module configured to receive a second signal and create a modulation signal based on the received second signal; and an electro-optical modulation module in operable communication with the optical storage module and the processing module, wherein the electro-optical modulation module is configured to receive the first signal from the optical storage module, receive the modulation signal from the processing module, and electro-optically modulate the first signal based on the modulation signal.

In some embodiments, the system further includes a control subsystem configured to automatically control at least one of the optical storage module, the processing module, and the electro-optical modulation module.

In some embodiments, the processing module includes a first analog-to-digital converter and a first digital-to-analog converter, and the first analog-to-digital converter is configured to generate a coarse digital estimate that is provided as input to the first digital-to-analog converter to provide an analog output to the electro-optical modulation module for removal from the first signal resulting in a residue signal. In some embodiments, the system further includes a second analog-to-digital converter receiving said residue signal and a digital signal processing module in operable communication with the first analog-to-digital converter and the first digital-to-analog converter, wherein the digital signal processing module is configured to receive a feedback signal of a digital residual estimate from the second analog-to-digital converter and perform at least one operation to modify the coarse digital estimate of the second signal to alter the modulation of the first signal. In some embodiments, the at least one operation includes at least one of a linear operation, a non-linear operation, a linear filter operation, a nonlinear filter operation, a linearization operation, an adaptive filter operation, a nonlinear adaptive filter operation, an equalization operation, an adaptive equalization operation, a scaling operation, a delaying operation, a phase shifting operation, a dispersion compensation operation, a complex value function-based operation, and an amplitude/phase transformation. In some embodiments, the feedback signal is selected from the group consisting of an open loop signal, a closed loop signal, a dither-based signal, and a cross-correlation based signal.

In some embodiments, the first signal is an analog RF signal.

In some embodiments, the second signal is selected from the group consisting of an analog signal, a digital signal, and a combination of an analog and digital signal.

In some embodiments, the second signal is received from a source selected from the group consisting of a sensor device, a timer, a geo-location device, and an external receiver.

In some embodiments, the electro-optical modulation module is configured to modulate the first signal by at least one of removing a feature from the first signal, adding a feature to the first signal, linearly modifying the first signal, and nonlinearly modifying the first signal.

In some embodiments, the second signal is derived from the first signal. In some embodiments, the system further includes a splitter to create at least a portion of the second signal from the first signal.

In some embodiments, the second signal is received in a baseband or intermediate frequency form.

In some embodiments, the second signal is received from one or more separate antennas or antenna beams of a phased array antenna.

According to another aspect, embodiments relate to an RF processing system. The system includes a tap device configured to receive an input signal and split the input signal into a first signal and a second signal; a delay module configured to receive and delay the first signal to create a delayed first signal; a processing module configured to receive the second signal and create a modulation signal based on the received second signal thereby producing a latency in the modulation signal that matches the delay of the delayed first signal, wherein the modulation signal contains estimates of undesired components; and an electro-optical modulation module in operable communication with the delay module and the processing module, wherein the electro-optical modulation module is configured to receive the delayed first signal, receive the modulation signal containing estimates of undesired components from the processing module, and subtract the estimated undesired components from the delayed first signal to produce a low amplitude signal.

In some embodiments, the system further includes a digital signal processor output module configured to digitally combine digitized copies of the low amplitude signal and the modulation signal estimating the high amplitude components to create a high dynamic range version of the input signal.

In some embodiments, the delay module includes an electrical-to-optical converter configured to convert the first signal to a modulated optical signal and hold the modulated optical signal in an optical delay to produce the delayed first signal. In some embodiments, the electro-optical modulation module includes an optical modulator and an optical-to-electrical converter, wherein the optical modulator receives the delayed first signal and the modulation signal and is further configured to modulate the delayed first signal to remove a filtered reference signal to produce a twice-modulated optical signal that is converted to a residual electrical signal output with regulated dynamic range by the optical-to-electrical converter.

In some embodiments, the delay module is optically implemented by at least one of a fiber optic transmitter, a fiber optic delay, and a fiber optic receiver.

In some embodiments, the system further includes at least one signal modifier in the delay module for modifying the delayed first signal.

According to yet another aspect, embodiments relate to an interference cancellation system. The system includes a first high dynamic range receiver configured to receive a first signal; at least one second high dynamic range receiver configured to receive at least one reference signal including interference; and a digital signal post processing module configured to receive the first signal, receive the at least one reference signal including interference, and remove the interference from the first signal.

BRIEF DESCRIPTION OF DRAWINGS

Non-limiting and non-exhaustive embodiments of the embodiments herein are described with reference to the following figures, wherein like reference numerals refer to like parts throughout the various views unless otherwise specified.

DETAILED DESCRIPTION

Figure 1:
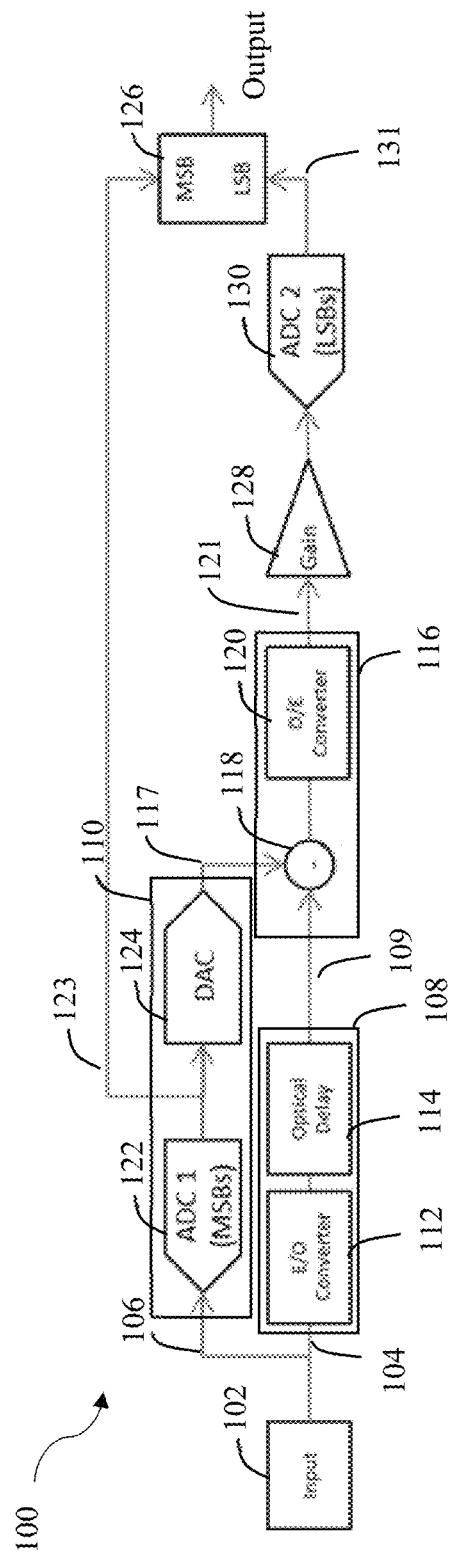
FIG. 1 illustrates an RF processing system in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The systems and methods described herein provide RF processing systems and methods that may remove multiple interferers while maximizing passed bandwidth. The systems and methods described herein may rely on two primary components: (1) low noise figure phase-modulated optical links for delaying the received signal(s); and (2) digital signal processors (DSPs) such as field programmable gate arrays (FPGAs), application-specific integrated circuits (ASICs), or other appropriately configured processing devices that allow for spectrum monitoring, filtering, and processing on a micro-second timescale. The time delays provided by the optical links may allow the systems and methods described herein to obtain knowledge of the EM spectrum and perform any appropriate signal modulation tasks.

FIG. 1 illustrates an RF processing system 100 in accordance with one embodiment. The system 100 may receive an input 102 including a first signal 104 and a second signal 106. The first signal 104 travels along an optical path to an optical storage module 108, and the second signal 106 travels along an electrical path to a processing module 110.

The first signal 104 may be an analog RF signal to be modified. The first signal 104 may be received from an RF antenna or any other RF equipment such as testing/measuring devices.

The second signal 106 may be an analog signal, a digital signal, or a combination of both. The second signal 106 may be produced by any suitable RF equipment or software algorithms. For example, the second signal 106 may be generated by a sensor device, a timer, a geo-location device, or the like. The second signal 106 may carry information about features to remove from the first signal 104, add to the first signal 104, or otherwise information regarding how to modulate the first signal 104.

The optical storage module 108 may include an electro-optic (E/O) converter 112 and an optical delay module 114. The optical storage module 108 may be in operable connectivity with an electro-optical modulation module 116 comprising an optical modulator 118 and an opto-electric (O/E) converter 120.

In some embodiments, the E/O converter 112 of the optical storage module 108 modulates the first signal 104 and the optical delay module 114 delays the first signal 104 to produce a delayed modulated optical signal 109. The optical delay module 114 may be implemented optically via a fiber optic transmitter, a fiber optic delay, and/or a fiber optic receiver.

The processing module 110 may include a first analog-to-digital converter (ADC) 122 and a first digital-to-analog converter (DAC) 124. The second signal 106 may be communicated to the first ADC 122, which generates a digital estimate 123 of the second signal 106. These are the most significant bits (MSBs), and may be communicated to an output processing module 126.

The digital estimate 123 is then converted back to an analog format by the first DAC 124 and provided as the modulation signal 117 to the optical modulator 118 of the electro-optical modulation module 116. Accordingly, the optical modulator 118 receives the delayed modulated optical signal 109 from the optical storage module 108 and the modulation signal 117 from the processing module 110. The optical delay module 114 may delay the first signal 104 as long as necessary for the first ADC 122 and the first DAC 124 to complete their conversions or for the processing module 110 to complete its operations.

The optical modulator 118 may then modulate the delayed modulated optical signal 109 based on the digital estimate 123 (via modulation signal 117) to create a residual signal 121. For example, a modulation operation may involve adding something to the first signal 104, removing something from the first signal 104, and/or otherwise linearly or nonlinearly modifying the first signal 104 to produce a residual signal.

The residual signal is then converted to an electrical signal by the O/E converter 120. The converted residual signal 121 is then amplified by an amplifier 128 to fill the range of a second ADC 130, and is then converted to a digital residual signal 131 by the second ADC 130. Digital residual signal 131 is related to the least significant bits (LSBs). The output processing module 126 may then process the most significant bits 123 and digital residual signal 131 to produce, for example, a high dynamic range (HDR) output. For example, the processing step in 126 may include scaling, equalizing, or similar operations tailored to more precisely add values from the first ADC 122 and the second ADC 130. However, in some embodiments, more advanced techniques or steps may be performed to further improve linearity.

Figure 2:
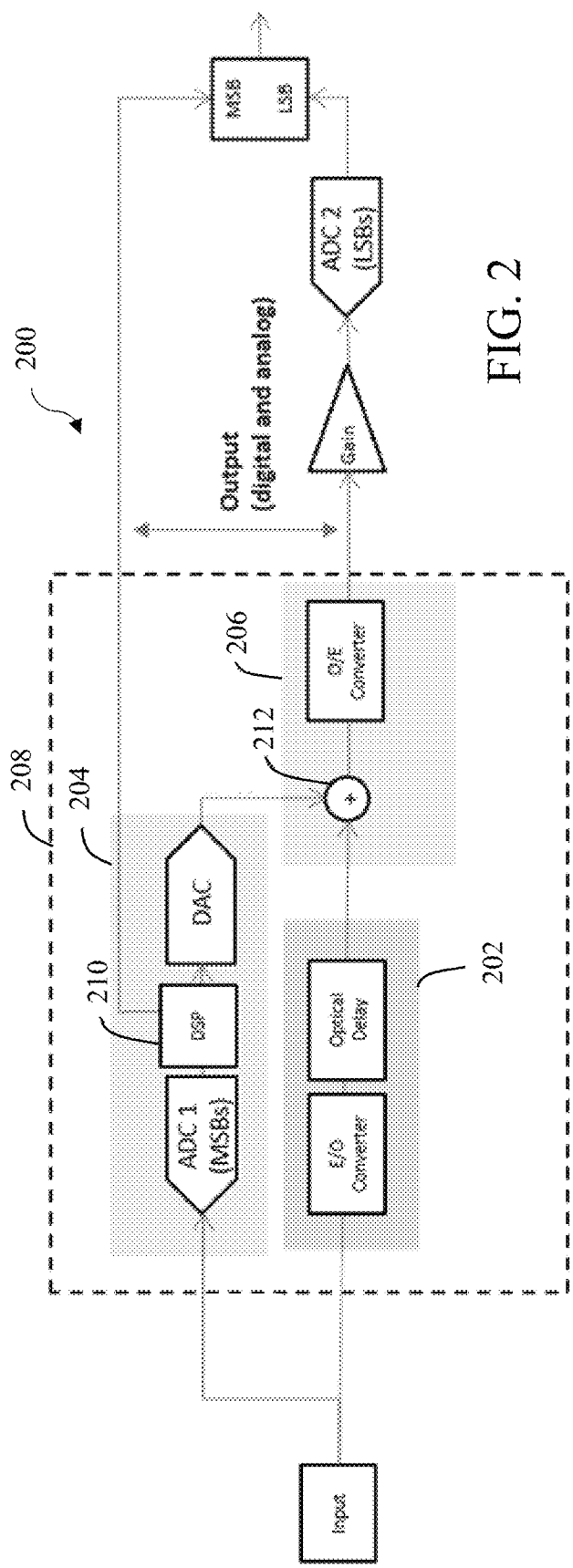
FIG. 2 illustrates an RF processing system in accordance with another embodiment.

FIG. 2 illustrates an RF processing system 200 in accordance with another embodiment. The system 200 is similar to the system 100 of FIG. 1. However, an optical storage module 202, a processing module 204, and an electro-optical modulation module 206 are all illustrated as part of an RF processing device 208. The processing module 204 of FIG. 2 is also shown as including a digital signal processing (DSP) module 210. The DSP module 210 may perform any required processing tasks regarding the received signals. The optical modulator 212 of FIG. 2 is illustrated as an addition optical modulator 212 to perform an addition modulation operation. The DSP module 210 can be used to invert the signal to perform a subtraction in the optical modulator 212.

Figure 3:
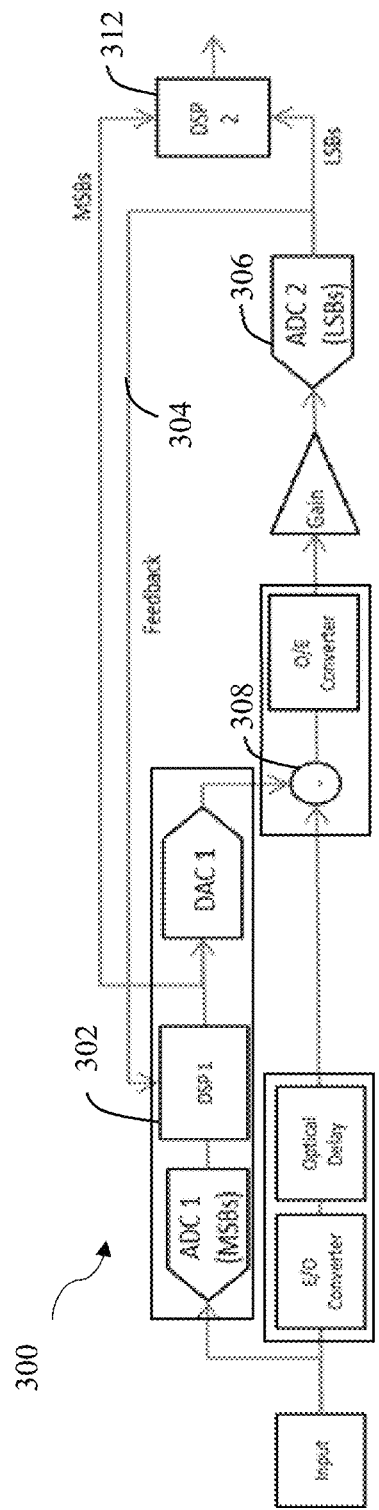
FIG. 3 illustrates an RF processing system in accordance with yet another embodiment.

FIG. 3 illustrates an RF processing system 300 in accordance with another embodiment. In this embodiment, a first digital signal processing (DSP) module 302 can receive a feedback signal 304 from a second ADC 306. Specifically, the first DSP module 302 may receive a feedback signal 304 of the residual signal from the second ADC 306.

The first DSP module 302 may then perform one or more operations to improve the modulation signal supplied to the optical modulator 308. Specifically, these operations may enhance the quality of the residual signal that is detected by the second ADC 306 and ultimately used by a second DSP module 312 to produce a high dynamic range output.

In some cases only the residual signal is of interest. The residual signal can be obtained in either analog or digital form from the output of the optical modulator 308 or second ADC 306 respectively, as discussed below.

The first DSP module 302 may perform operations such as linear filtering, nonlinear filtering, linearizing, adaptive filtering, nonlinear adaptive filtering, equalizing, adaptive equalizing, scaling, delaying phase shifting, dispersion compensation, complex value function-based operations, amplitude/phase transformations, or the like. This list of operations is merely exemplary and other types of operations in addition to or in lieu of those mentioned above may be used.

The feedback signal 304 may be an open loop, a closed loop, a dither-based loop, a cross-correlation-based loop, or the like. For example, the first DSP module 302 may cross-correlate the output residual signal with the processed second signal to create an error signal. The first DSP module 302 may, for example, modify the magnitude, phase weights, and/or equalization parameters.

When multiple interferers are present in the first signal, there may be multiple processed second or "reference" signals that are summed together. The cross-correlation step can occur independently for each signal, thereby allowing separate weights to be tuned for each signal.

In a dither-based feedback signal, the first DSP module 302 may dither the magnitude and phase weights/equalizers or the in-phase and quadrature weights associated with the signal to detect the harmonic frequency content of the dithers in the residual signal. The DSP module 302 may then process the harmonic content to create an error signal that may be used to provide feedback to the magnitude and phase weights. In other embodiments, an external dither signal may be supplied to a sync demodulator and integrator to achieve the same effect.

In another embodiment the systems and methods described herein may create a feedback loop with an error signal by cross-correlating the DAC output signal with the residual signal to fine tune the modulation operation. Accordingly, a cross-correlation operation may cross-correlate the DAC output signal with the residual signal to create an error signal. The error signal may be further processed in 302 to magnitude and phase weights or equalizer parameters.

Figure 4:
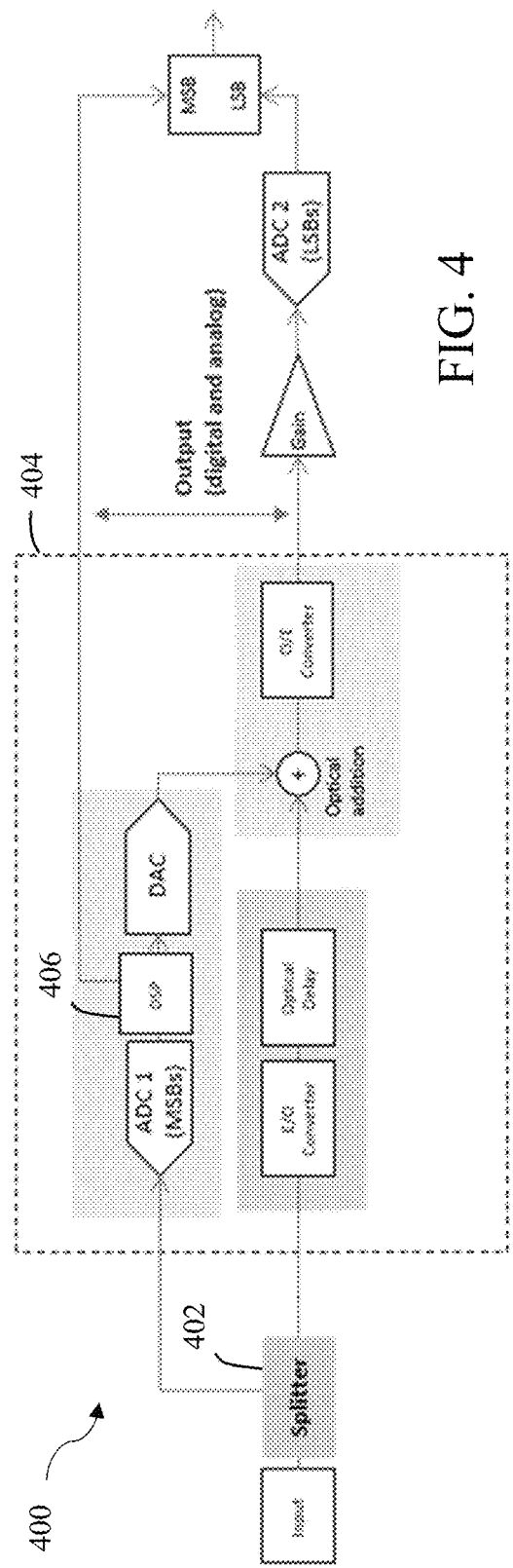
FIG. 4 illustrates an RF processing system in accordance with still another embodiment.

FIG. 4 illustrates an RF processing system 400 in accordance with another embodiment. The system 400 of FIG. 4 is similar to the systems 100-300 of FIGS. 1-3. However, the system 400 of FIG. 4 includes a splitter 402 to process the provided input into the first and second signals. That is, the splitter 402 may create at least a portion of the second signal. In other words, in these embodiments, the second signal is derived from the first signal. The splitter 402 may be variable and controlled by the RF processing device 404 and/or some other automation subsystem.

Or, in other embodiments, the signal may be obtained from a sample or a tap taken from another system. The signal may be in the form of baseband or intermediate frequency (IF), and the systems of FIGS. 1-4 may include any required frequency conversion tools.

In some embodiments, the inputted signal may be obtained from one or more separate antennas or antenna beams from a phased array antenna. The signal may be nonlinearly related to the unwanted signals such as harmonics or intermodulation products that are present in the received signal. In these cases, the DSP module 406 may execute a nonlinear filtering processes.

As mentioned previously, the output of the systems of FIGS. 1-4 may be a high dynamic range (HDR) signal. In some embodiments, the output may be or otherwise include an estimated low amplitude signal. Or, the output may include an estimated high amplitude signal and an estimated low amplitude signal. For example, the estimated high amplitude and the estimated low amplitude signals may both be sampled by an ADC (e.g., the second ADC 130 of FIG. 1). A processing module such as the output processing module 126 of FIG. 1 may then combine the estimated low and high amplitude signals to produce a high dynamic range signal for output.

Figure 5:
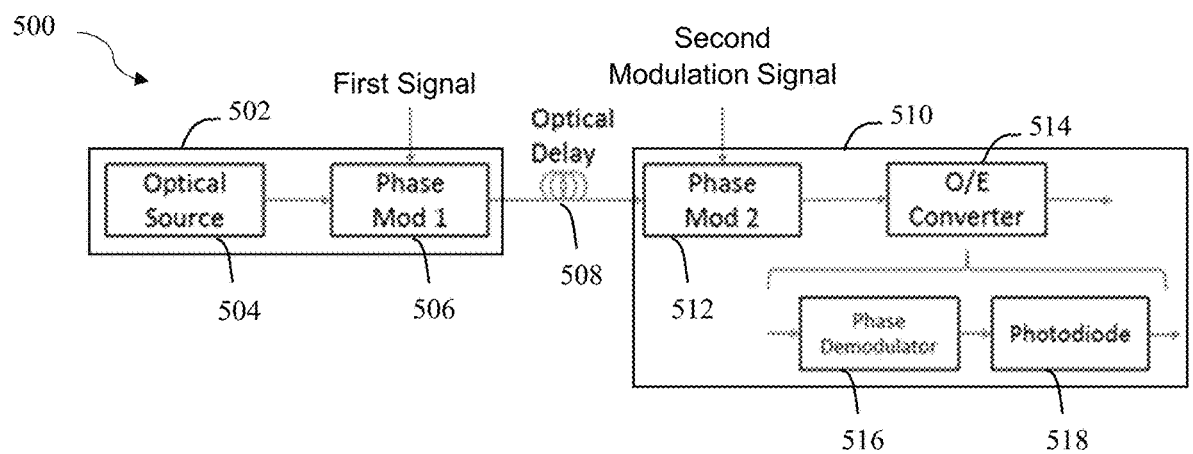
FIG. 5 illustrates cascaded phase modulators in accordance with one embodiment.

FIG. 5 illustrates a phase modulator configuration 500 in accordance with one embodiment. The E/O converter 502 may be similar to the E/O converters of FIGS. 1-4, for example, and may include an optical source 504 and a first phase modulator 506. The cascaded phase modulator configuration 500 may be implemented in conjunction with any of the systems of FIGS. 1-4.

The first optical phase modulator 506 may accept light from the optical source 504 and may receive the first signal such as the first signal 104 of FIG. 1. Light from the optical source 504 is phase modulated to produce a phase modulated optical signal. The phase modulated optical signal is delayed optically by the optical delay 508 (as discussed previously) to produce a delayed, phase modulated optical signal. Although not illustrated in FIG. 5, the optical delay 508 may be implemented by an optical delay module such as the optical delay module 114 of FIG. 1. The electro-optical modulation module 510 may include a second phase modulator 512 and an O/E converter 514. The O/E converter 514 may further comprise a phase demodulator 516 and one or more photodiodes 518.

The electro-optical modulation module 510 may receive the delayed phase modulated optical signal and the second modulation signal. Light from the optical source 504 is phase modulated by the second phase modulator 512 to produce a twice-phase modulated optical signal. The O/E converter 514 may then convert twice-phase modulated optical signal to electrical signals.

Optical-to-electrical converters such as the O/E converter 514 generally convert intensity-modulated signals to electrical amplitude modulated signals. To convert phase modulated light to electrical signals, however, one must first convert the phase modulated light to intensity modulated light using an optical phase demodulator such as the phase demodulator 516.

Figure 6:
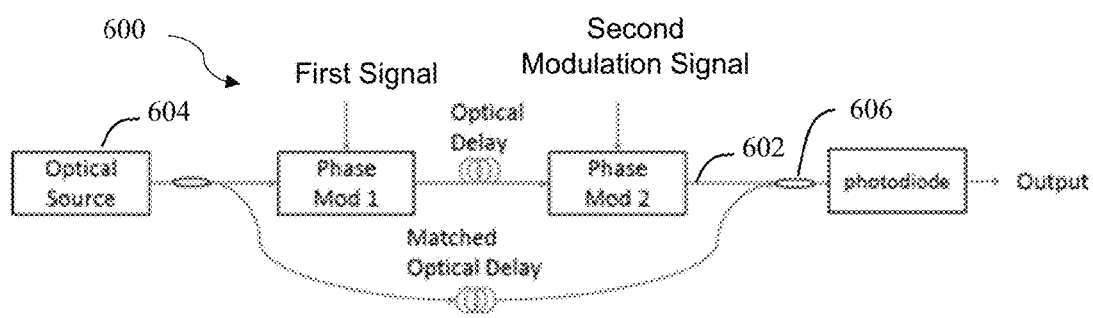
FIG. 6 illustrates cascaded phase modulators in accordance with another embodiment.

FIG. 6 illustrates an exemplary phase modulator configuration 600 in accordance with another embodiment. In this embodiment, the phase-to-intensity conversion may be provided by mixing the twice-phase modulated light 602 gathered from a common optical source 604 at a phase demodulator 606. Although the configuration 600 illustrates matching optical delays, this is not necessarily required. However, matching the optical delays improves performance. The configuration 600 may be implemented in conjunction with any of the systems of FIGS. 1-4.

Figure 7:
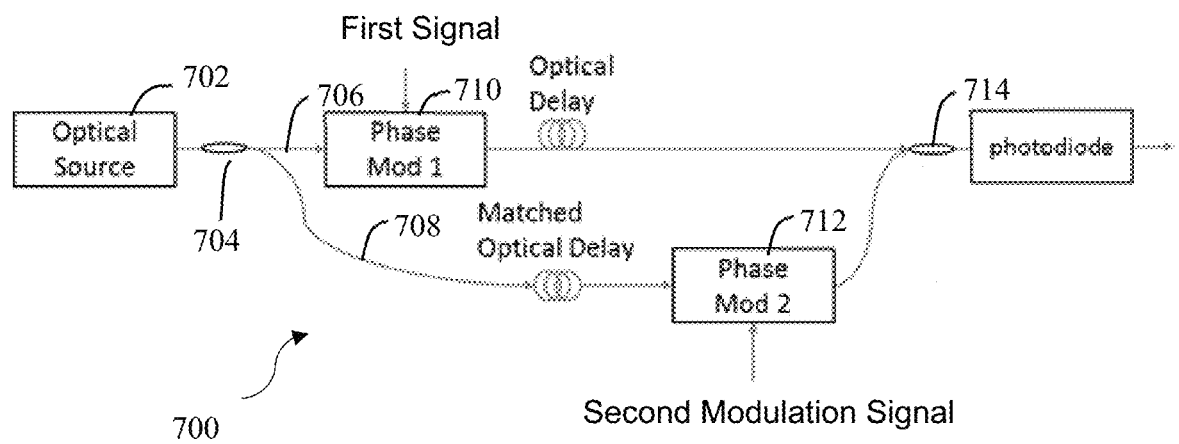
FIG. 7 illustrates cascaded phase modulators in accordance with yet another embodiment.

FIG. 7 illustrates an exemplary phase modulator configuration 700 in accordance with another embodiment. In this embodiment, a laser from an optical source 702 is split by a splitter 704 into a modulated path 706 and an unmodulated path 708. The configuration 700 may be implemented in conjunction with any of the systems of FIGS. 1-4.

A first phase modulator 710 along the modulated path 706 receives the first signal and converts the first signal to a modulated optical signal. As with previous embodiments, the modulated optical signal is then held in an optical delay to produce a delayed modulated optical signal.

The unmodulated optical path 708 includes an optical delay to match the optical delay in the modulated path 706. The optical delay is not strictly necessary, but may improve performance. The unmodulated optical path does, after the optical delay, include a second phase modulator 712 that receives the second modulation signal. The second phase modulator 712 may be part of an electro-optical modulation module such as those discussed in previous embodiments.

The RF input to 712 may be driven by the estimated high amplitude signal to produce a second modulated output (not numbered). The second modulated output may be communicated to a phase demodulator 714 operably connected to the modulated path 706 and the second phase modulator 712.

Figure 8:
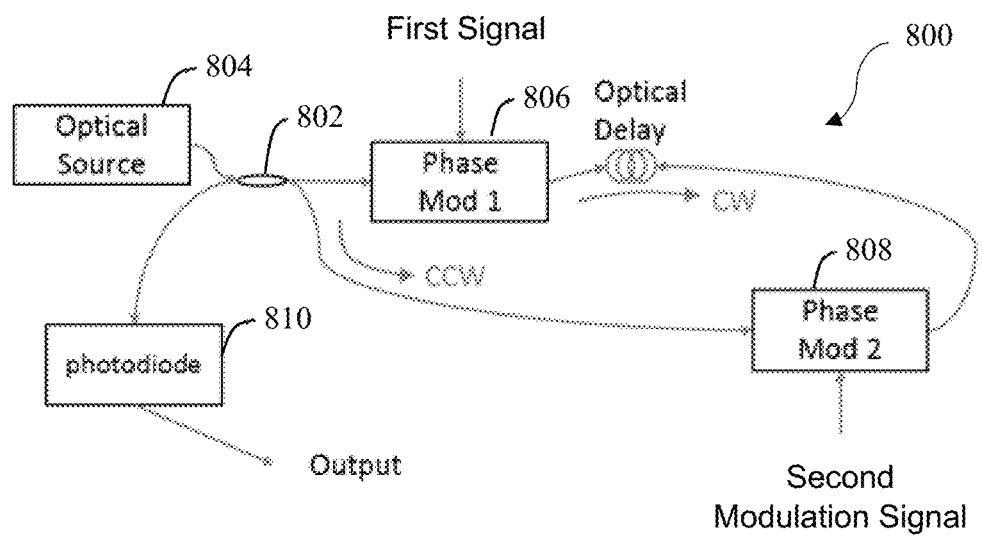
FIG. 8 illustrates a modulator configuration in accordance with one embodiment.

FIG. 8 illustrates an exemplary phase modulator configuration 800 in accordance with another embodiment. In this embodiment, a single device 802 acts as both an input coupler and an output coupler (for simplicity "coupler 802"). Light from an optical source 804 is input via the coupler 802 to produce clockwise (CW) and counter-clockwise (CCW) propagating light. The configuration 800 may be implemented in conjunction with any of the systems of FIGS. 1-4.

A pair of modulators 806 and 808 (e.g., traveling wave devices) may each apply modulation to light traveling in only one of these directions. The counter-propagating light fields would recombine, interfere at the coupler 802, and then produce a signal on the photodiode 810. In this embodiment, optical delays may be chosen between the modulators 806 and 808 to accommodate any processing-related latency.

Figure 9:
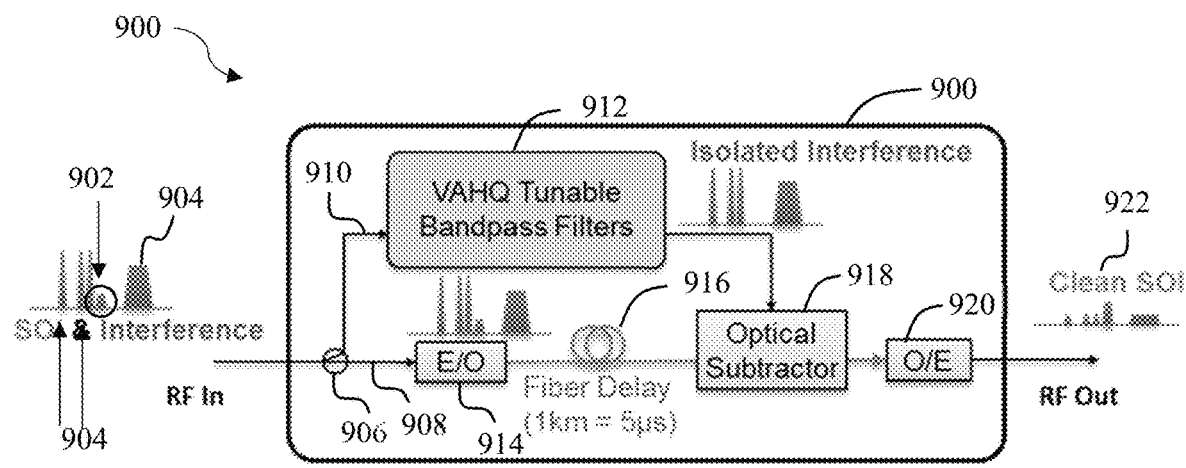
FIG. 9 illustrates a system for reducing interference in RF communications in accordance with one embodiment.

FIG. 9 illustrates a system 900 for reducing interference in RF communications in accordance with one embodiment. Although illustrated somewhat differently, the system 900 may be similarly configured to and operate similarly as the systems of FIGS. 1-4. The system 900 may receive an RF input including a signal of interest (SOI) 902 (circled) that is corrupted by interference 904.

The RF input may constitute a high dynamic range signal. A high dynamic range is often needed to detect weak signals in the presence of unwanted high-power interference. However, a high dynamic range signal may overload the receiver that the system 100 is intended to protect.

Using novel optical methods, the system 900 may store the high dynamic range signals for many µs without distortion or noise figure (NF) degradation. A tap device 906 may first split the received RF input into a first signal 908 and a second signal 910.

The second signal 910 may be communicated to one or more filters 912 (e.g., executed by a processing module such as the processing modules of FIGS. 1-4). The filters 912 may be tunable bandpass filters, for example. In a general sense, the filters 912 may extract an isolated copy of the interference, discussed below.

The first signal 908 may be communicated to an electric-optic (E/O) converter 914, and then to low noise figure phase-modulated optical links 916 that allow for storage of high dynamic range RF signals (at 5 µs/km). These optical fiber coil/link(s) 916 provide the signal delay. In a general sense, and although not shown in FIG. 9, the E/O 914 and links 916 essentially make up an optical storage module such as the optical storage modules of the previous figures.

Delaying the high dynamic range (HDR) RF signals in the low-loss optical links 916 enables the systems and methods described herein to analyze the second signal 910 to (1) obtain knowledge of the EM spectrum, (2) extract a clean sample of the interference using the filters 912, and (3) invert and equalize a copy of the extracted interference for use in active cancellation.

The optical links 916 may support wideband signal storage in any portion of the RF spectrum for up to tens of µs using compact, low-loss optical fiber. For example, a 1 km coax delay line would degrade the NF by an unusable amount compared to a 1 km fiber, which has less than 0.2 dB of loss and occupies less than 1 cubic inch of volume.

These links 916 may offer four additional key benefits. First, the links 916 are linear in voltage as opposed to the distortion-inducing sine voltage-to-intensity transfer function of traditional Mach-Zehnder intensity modulators. Second, the links 916 can be cascaded to combine wide-band, high-frequency signals from multiple sources. Third, this cascading of the links 916 provides the opportunity to linearly subtract high-amplitude interfering signals in the optical phase domain before they undergo phase-to intensity conversion. Fourth, and as discussed above, the lossless fiber delay lines can store high dynamic range RF signals.

Accordingly, this optical phase modulated topology enables the systems and methods described herein to establish a low noise figure in the presence of high power signals without suffering distortion. By adding a second phase modulator after the delay as discussed below, the system 900 can implement a nearly perfect wideband (DC-40 GHz) subtraction element.

Referring back to FIG. 9, the delay produced by the optical links 916 provides a unique opportunity to identify problematic frequencies within the EM spectrum and to tune the filters 912 to extract a clean sample of the interference 904. An optical subtractor 918 or similarly configured modulation element may then subtract the copy of the interference 904 from the first signal 908. The resultant signal (with the interference removed) may then be converted to an electric signal via an opto-electric converter 920 and provided as an output. The output is therefore a clean SOI 922 with the interference removed.

Figure 10:
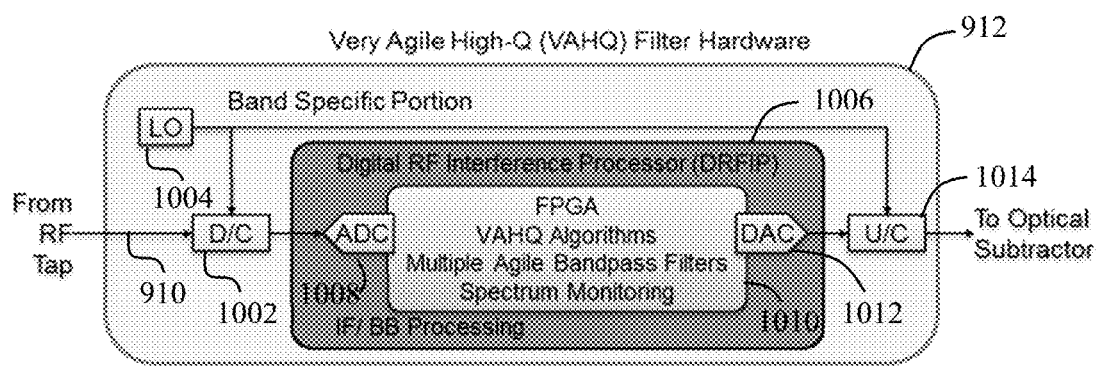
FIG. 10 illustrates the filters of the system of FIG. 9 in accordance with one embodiment.

FIG. 10 illustrates the filter(s) 912 of FIG. 9 in more detail. The second signal 910 may be first passed through a mixer constituting an RF down-converter (D/C) 1002. The RF D/C 1002 may be provided with a local oscillator (LO)

1004 to lower the frequency of the second signal 910 to produce an intermediate frequency (IF). The LO 1004 may have a fixed, switchable, or tunable frequency that may depend on the application.

The second signal 910 may then be communicated to a digital RF Interference Processor (DRFIP) sub-assembly 1006 that identifies, isolates, and produces a clean digitized copy of the interfering signal(s). The DRFIP sub-assembly 1006 operates on the received IF-second signal 910. The DRFIP includes a cascade of components similar to those used in Digital RF Memory (DRFM). These components may include analog-to-digital converter(s) (ADC) 1008 for sampling the EM environment, digital hardware such as a field programmable gate array (FPGA) 1010, an application specific integrated circuit (ASIC), or other similarly configured processor for implementing various algorithms (e.g., spectrum monitoring and one or more agile bandpass filter instances), and digital-to-analog converter(s) 1012 for reproducing a filtered, analog copy of the interference.

The output of the DRFIP sub-assembly 1006 may be communicated to an RF up-converter (U/C) 1014. The RF U/C 1014 may be provided with the LO 1004 to increase the frequency of the second signal 910 before communication to the optical subtractor 918 of FIG. 9.

The DRFIP may implement spectrum monitoring (e.g. using a Fast Fourier Transform (FFT)) and execute a thresholding procedure to identify the frequencies of high level interferers. The identified frequencies can be used to set the center frequencies of the tunable bandpass filters.

The system 900 may output either an analog or a digital signal. Analog signals may be useful if the system 900 is paired or otherwise used in conjunction with a third party or legacy system receiver. Digital outputs may be desirable when the receiver is integrated with cancellation technology.

There may be a need in some applications to retain both the high amplitude and low amplitude signals and associated data such as in-phase and quadrature data. Accordingly, the systems and methods described herein may be configured to output the high-level and low-level signals separately, or combined into a single high dynamic range output via additional signal processing procedures. This type of digital signal output may contain a higher effective number of bits (ENOB).

In some applications, there may be a need to establish an RF over Fiber (RFoF) link between a remote antenna site and a centralized receiver. In many of these cases, the RFoF link, which is has historically been based on intensity modulators, may constitute the part of the applicable system that is most vulnerable to saturation or distortion.

The features of the systems and methods described herein may be implemented in these types of applications. For example, one configuration may involve a primary module with an RF output that is installed at a central location, and an antenna interface module with an RF input that is installed near the antenna. The two modules may be connected via a single mode fiber cabling.

This type of embodiment may be used in locations in which there is no physical room or electrical power to support the required signal processing electronics near the antenna location. In these applications or configurations, the tap that is normally present at the input to the system would feed a second optical link either implemented with a second fiber or separate wavelength.

Figure 11:
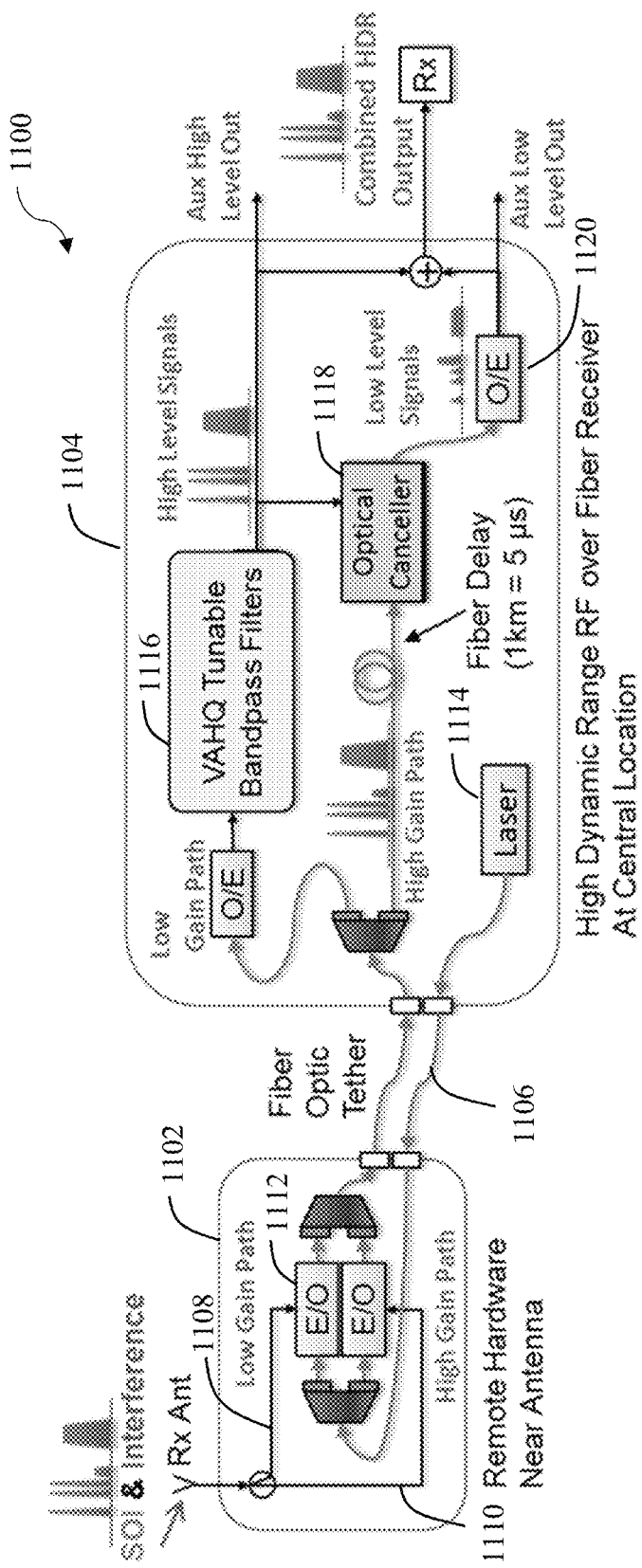
FIG. 11 illustrates a remote antenna configuration in accordance with one embodiment.

FIG. 11 illustrates a remote antenna configuration 1200 in accordance with one embodiment. As with the previous embodiments, the fiber delay matches the filter latency. Additionally, this embodiment may use a filter consisting of a DRFIP sub-assembly to implement the digital signal processing DSP tasks, as well as the associated up- and down-converters to translate the high RF or microwave signals to lower intermediate frequencies that the ADCs and the DACs in the DRFIP sub-assembly can process.

As seen in FIG. 11, this configuration 1200 includes a remote antenna interface module 1202 and a primary module 1204 connected by a fiber optic cable 1206. The remote antenna interface module 1202 is located at a remote location near an antenna. The primary module 1204 is located at a central location.

The remote antenna interface module 1202 includes a dedicated fiber-optic low-gain link 1208 to support the transfer of the tapped signal and a high gain link 1210. The tapped link should be relatively linear after reception and therefore must be driven more lightly than the main link of interest. After reception, the SOI can be processed as described above in conjunction with the previous figures. That is, the identified harmful interferers can be subtracted from the high gain link 1210.

In the time provided by the fiber delays, an FPGA or ASIC can execute sophisticated RFoF Dynamic Range Recovery (DRR) algorithms that leverage the linearity of the optical phase space to subtract out high amplitude interference. Additionally, and as seen in FIG. 11, the antenna interface module 1102 includes electro-optic (E/O) phase modulators 1112. The remaining hardware such as lasers 1114, optical receiver components, and electronics, are located away from the antenna at a more convenient and protected location.

The remainder of the high-gain link 1110 after subtraction has high spectral integrity after subtraction at optical canceller 1118, with information of interest to the end user. The only exception is in the portions of the spectrum where the interferers previously existed. There, the spectrum is corrupted. However, the residual interference is low and no longer devastates any protected receiver by overdriving the receiver beyond its dynamic range.

The low gain optical link 1108 and a high gain optical link 1110 are used in concert to provide a high-dynamic range, low loss RF distribution system. They primary high-gain phase modulated optical link 1110 conveys the full section, high dynamic range signal. The supporting low-gain optical link 1108 facilitates DRR by forwarding the large amplitude signals with reduced gain to one or more filters of a filter module 1116. The low-gain optical links 1108 can use more conventional intensity modulated (or even digitized signal over fiber) approaches as long as its characterization of the signal remains linear.

As in the previous embodiments, the filter module 1116 contains RF frequency conversion hardware, ADCs, DACs, and an FPGA running DSP. As discussed previously, the filter module 1116 may identify, isolate, and reproduce an inverted copy of high level distortion-inducing signals and to feed them forward to the optical canceller 1118. The optical canceller 1118 may use an additional phase modulator to remove the large amplitude signals from the high gain link 1110. A final O/E converter 1120 outputs the residual RF signal with the high level interference removed.

The systems and methods described herein may operate in a variety of modes to accomplish various objectives. One mode is a tunable hopping BPF mode, in which the systems and methods described herein attempt to cancel everything in the ADC Nyquist bandwidth except the SOI. This mode is suited for narrow band frequency hopping radios, or rapid scan electronic intelligence (ELINT) operations.

The output from the DFRIP in this embodiment may be an inverted copy of the input with the SOI spectral region notched out. The DRFIP output is supplied to an optical canceller, which effectively results in bandpass filtering the SOI. One advantage achieved by the optical delay line is that frequency hopping settling time is essentially zero.

Another operative mode may be referred to as the "tunable interference notching mode." This mode cancels high-level interference by forming a band-reject filter at an identified interference frequency. This mode is therefore suitable when narrow band interference corrupts wideband signals of interest such as in wideband networking, spread spectrum communications or other types of communications that would overload electronic intelligence detectors.

This interference notching mode can automatically identify high level interference using spectral analysis. An FFT module may identify the frequencies of the highest power signals exceeding a definable threshold. The fast Fourier transform must be long enough to accurately identify problematic frequencies to achieve so as to surgically apply high-Q cancellation resources.

For applications that require zero outages, a copy of the digitized input may be buffered by a FIFO to allow time for the FFT to block-process the signal. In applications where the interference is largely static in frequency, or in applications in which outages that are microseconds long are acceptable, the FIFO stage can be omitted.

Various embodiments of the systems and methods described herein may also operate in what may be referred to as a "look behind" mode. These embodiments may leverage additional information taken from an on-platform transmitter or secondary antenna or equivalent that relates to the causes of co-site interference. When a sample of interference is available in this way, the systems and methods described herein may provide a level of "look-behind" capability that removes on-channel co-site interference from received inputs to reveal the SOIs that are hidden "behind" the co-site interference.

The level of improvement is directly related to the cancellation depth, width, and ability to remove only the co-site interference and not the SOI. It is this last requirement that precludes the use of traditional, band stop filters because in the "look-behind" scenario the interference is implied to falls directly within the bandwidth of the SOI.

Figure 12:
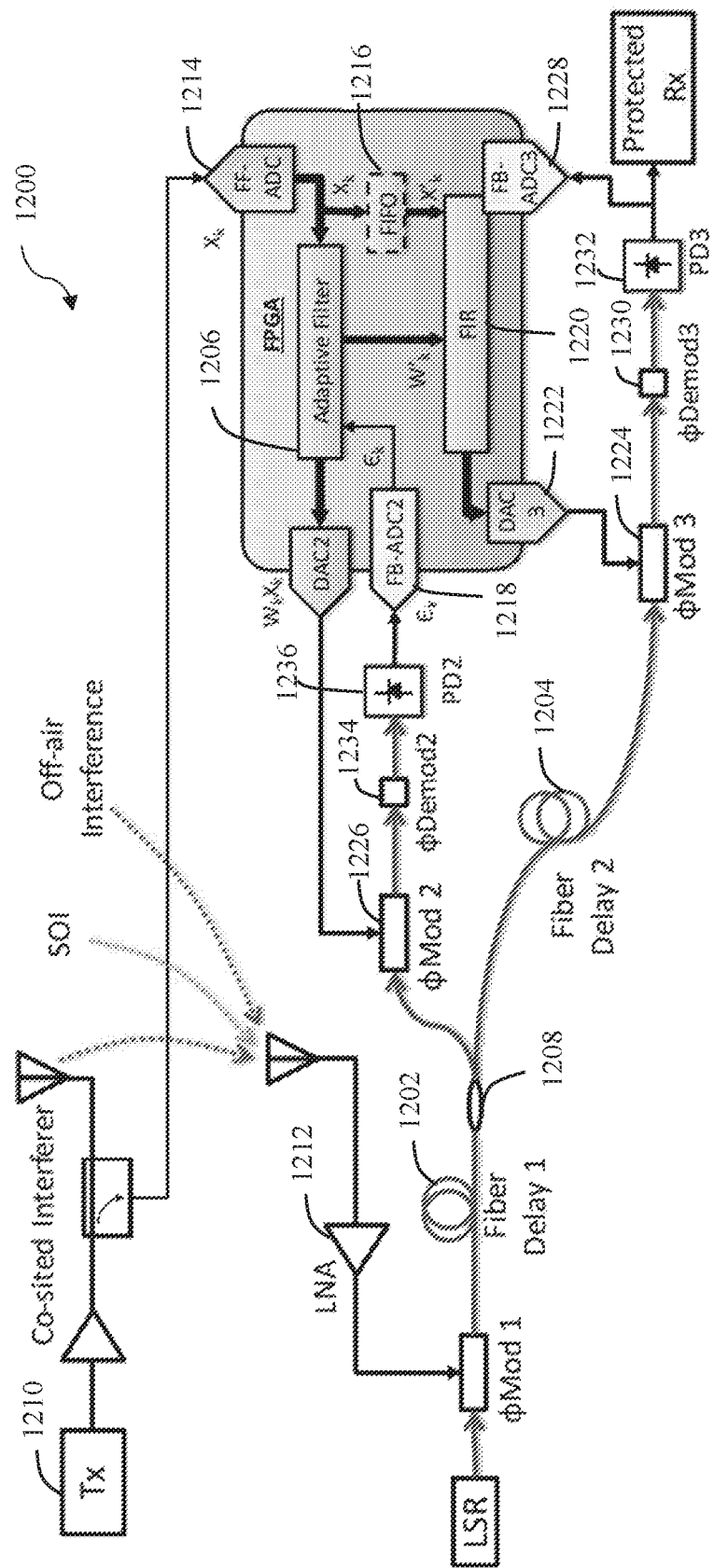
FIG. 12 illustrates a system for reducing interference in RF communications in accordance with another embodiment.

FIG. 12 illustrates a system 1200 for reducing interference in RF communications in accordance with another embodiment. The system 1200 provides this "look-behind" capability and uses an optical delay to gain prior knowledge of the channel by using an adaptive filter to obtain an inverse channel model.

Due to feedback loop bandwidth limitations, standard adaptive filters often struggle to track a rapidly changing channel. By splitting the optical path and leveraging not only a first optical delay 1202 but also a second optical delay 1204, the system 1200 provides time for an adaptive filter 1206 to converge toward an optimal set of coefficients via feedback as in previous embodiments, and to then apply the now-optimized coefficients to the delayed copy of the signal. This technique allows the system 1200 to optimize an inverse channel model and apply it retroactively to cancel a delayed copy of the interference.

More specifically, in this embodiment, a second optical path following an optical splitter 1208 buys time for the adaptive filter 1206 to be trained to best cancel interference given the current state of the channel between the interfering transmit antenna 1210 and the Rx antenna's LNA 1212.

A tap of the interferer is digitized at the feed-forward ADC 1214. The digitized information ($X_k$) not only forms the input to the adaptive filter 1206, but is also stored in a FIFO module 1216 for later use ($X'_k$).

The adaptive filter 1206 evolves the weighting $W_k$ towards an optimum weighting that minimizes the error signal $\epsilon_k$ received at the FB-ADC2 1218. An algorithm is used to select an optimal set of weights $W'_k$ to be used in a finite impulse response (FIR) filter 1220 given hindsight into the evolution of the adaptive filter 1206.

The optimum DAC output $W'_k * X'_k$ is now known, and can be applied to the copy of the optical signal delayed by Fiber Delay 2 1204 when it arrives at ΦMod3 1224 for optimal cancellation. The cancellation occurs again, as it did at ΦMod2 1226, but this time without allowing interference to leak through due to weights that have not yet been optimized.

A second feedback ADC (FB-ADC3) 1228 may be used to ensure that complete cancellation occurs at ΦMod3 1224, thereby compensating for any drift in the length of the second fiber delay 1204. The system may further include a ΦDemod3 1230 and a pulse density modulator 1232 before communicating the signal to the FB ADC3 1228 and/or the protected system.

When cancelling off-platform interference, the FB-ADC2 1218 (which may receive signals from a ΦDemod3 1234 and a pulse density modulator 1236) can act as a FF-ADC, and the FB-ADC3 1228 can act as the FB-ADC for the standard DRFIP firmware described earlier (not included in FIG. 12 for simplicity).

Some embodiments of the systems and methods described herein may also include or otherwise incorporate an RF canceller in conjunction with the delay-assisted approaches discussed above. These embodiments may therefore leverage additional information such as a reference tap taken from a co-sited transmitter or from secondary antenna(s) pointed at the interference source(s).

When a reference tap is available in this way, the systems and methods may also provide the previously-discussed look-behind functionality to remove co-site interference from received inputs to reveal the SOI that is/are hidden beneath the co-site interference. As discussed previously, the provided improvement is directly related to the cancellation depth, width, and ability to remove only the co-site interference and not the SOI.

Figure 13:
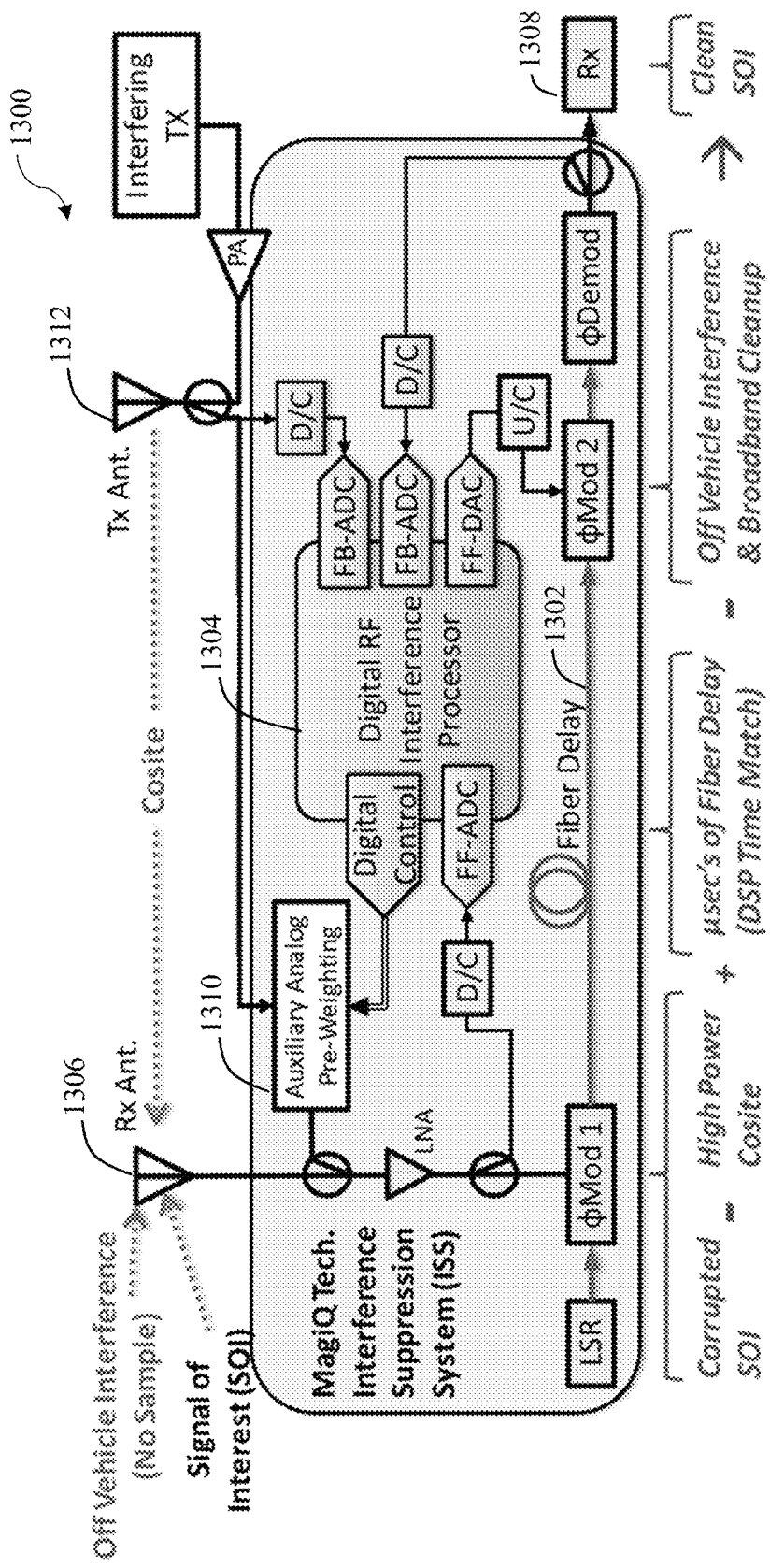
FIG. 13 illustrates a system for reducing interference in RF communications in accordance with another embodiment.

FIG. 13 illustrates a system 1300 for reducing interference in RF communications using these features in accordance with one embodiment. As seen in FIG. 13, the fiber delay 1302 and the DRFIP 1304 are integrated with traditional analog cancellation technology.

The Rx antenna 1306 in FIG. 13 is subjected to severe interference from multiple sources and also receives a SOI. This interference can include on-platform interference as well as off-platform sources for which no sample (tap) is available.

The system 1300 of FIG. 13 therefore fits between the antenna 1306 and the protected receiver 1308. If a tap is available from an interfering, on-vehicle transmitter, the system 1300 can use the sample to provide high power cancellation. In some cases, the system 1300 can also provide on-channel, look-behind communications support. Previously, this capability has been restricted to very narrowband interferers due to challenges in matching phase and amplitude over bandwidth.

When there is an operational requirement for high power handling, the system 1300 may rely on or otherwise execute an auxiliary analog pre-weighting module 1310. This pre-weighting module 1310 provides a rough level of cancellation, which can later be improved in the primary off-vehicle interference & and broadband cleanup stage.

The cancellation capability is controlled by the DRFIP 1304. The system 1300 is essentially an analog canceller capable of leveraging the full power of digital filters by using the low-loss optical fiber delay 1302 to compensate for the latency of the digital filtering and signal processing. As in previous embodiments, this allows an analog copy of a corrupted high dynamic range signal to be stored and therefore gives the DRFIP 1304 time to process the interfering signal and output a cancellation signal to subtract the interference from the SOI.

The DRFIP 1304 may rely on a series of novel procedures to combat a number of previously unsolved challenges of analog cancellation. These challenges may include performing a broadband cleanup of a tapped Tx that is coupled through a dispersive channel, cancelling multipath interference on a moving vehicle, and cancelling off-vehicle interference at close-in frequencies without a sample.

Figure 14:
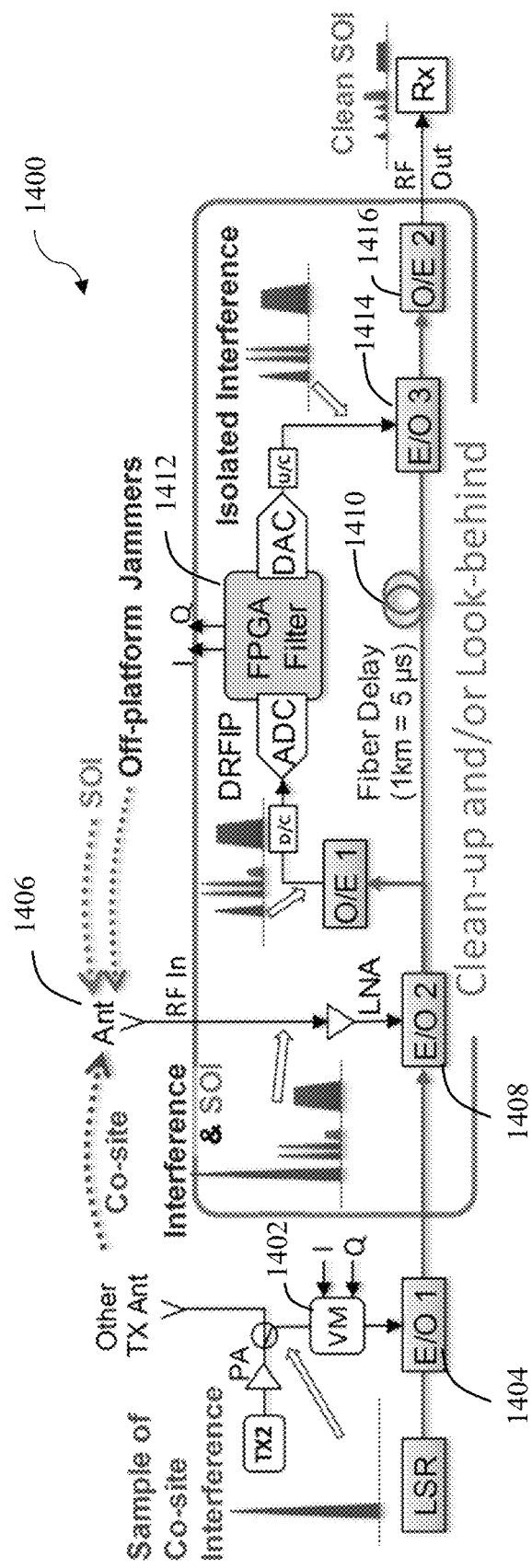
FIG. 14 illustrates a system for reducing interference in RF communications in accordance with still another embodiment.

FIG. 14 illustrates a system 1400 for reducing interference in RF communications in accordance with another embodiment. The system 1400 is similar to the system 1400 of FIG. 13 discussed above. However, the main difference is that an analog sample of the co-sited interferer is manipulated in phase and amplitude by an RF vector modulator 1402 in the system 1400 (whereas the auxiliary analog pre-weighting module 1410 performs this function in the system 1400 of FIG. 13). Another difference between the system 1400 of FIG. 13 and the system 1400 of FIG. 14 is that the injection of the cancellation signal is performed by the coupler in FIG. 13, while the E/O 1 1404 performs this function in FIG. 14.

A SOI is corrupted by high power co-site and off-platform interference and is received at the antenna 1406. The composite RF constitutes an HDR signal that would overload a standard receiver. A sample of the co-sited transmitter inserted at the electro-optic phase modulator E/O 1 1404 allows the cancellation of the bulk of the co-sited interference at the second phase modulator (E/O 2) 1408. Optical phases combine linearly, thereby enabling the interference to be linearly subtracted from the input received at the antenna 1406. A clean-up stage is needed as multipath reflections off adjacent surfaces prevent complete cancellation over wide bands.

The remaining signals are still phase-modulated so the remaining co-site (as well as other HDR off-platform) interferences can be stored for several μs without distortion or noise figure (NF) degradation. While these signals are stored in the fiber coil 1410, the filter assembly 1412 identifies, isolates, and reproduces an inverted copy of the interfering signal to provide to the final optical canceller E/O 3 1414.

As in the previous embodiments, the optical phases combine linearly so that an isolated copy of the interference can be linearly subtracted from the stored HDR optical signal. A phase demodulator and photodiode in the final opto-electric conversion stage O/E 2 1416 convert the residual signal back to an RF signal. The output is therefore a clean, undistorted SOI that has a low enough dynamic range so as to not overload the protected receiver. Such links can be designed to support wideband communications or signal analysis in any portion of the RF spectrum.

Figure 15:
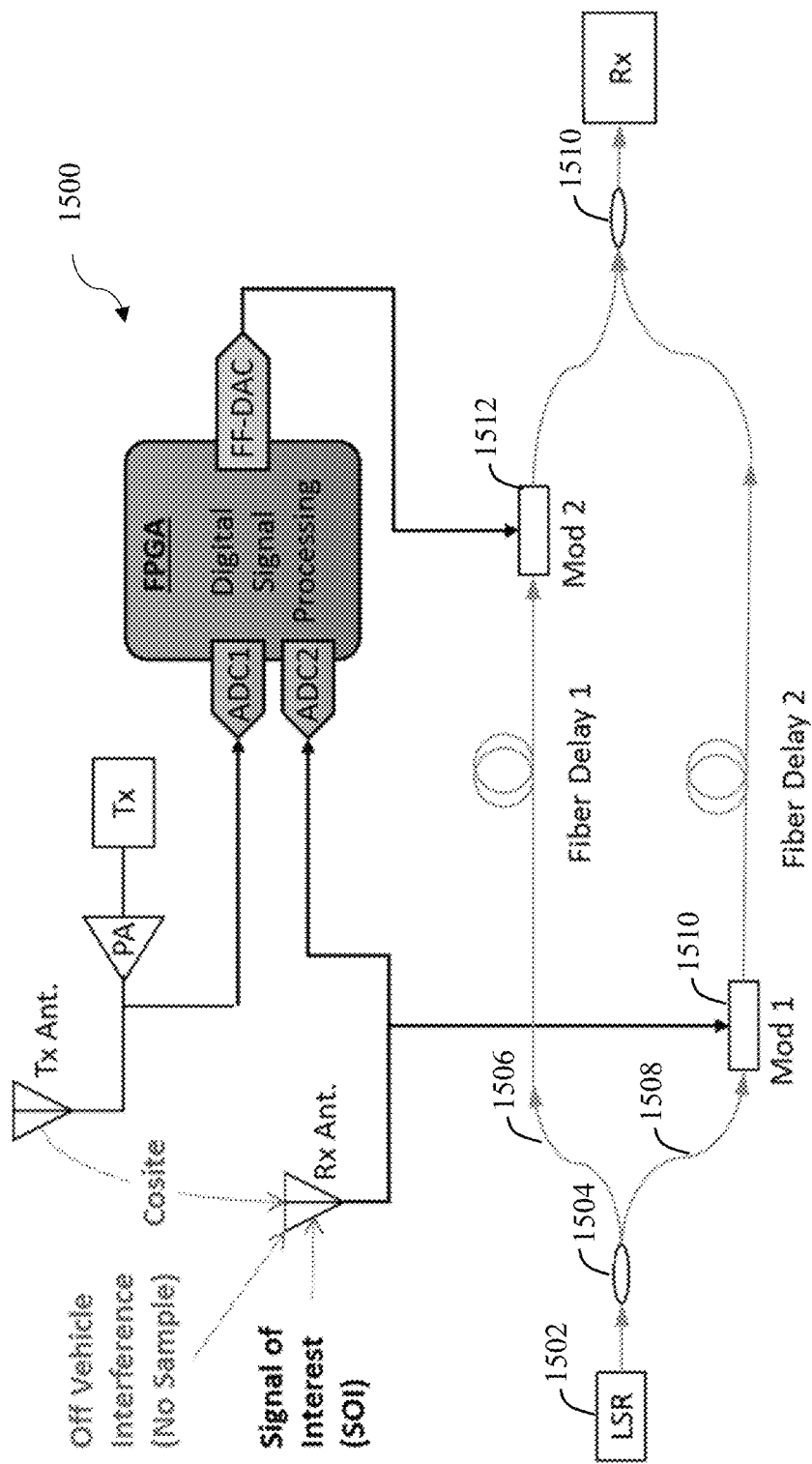
FIG. 15 illustrates a system for reducing interference in RF communications in accordance with yet another embodiment.

FIG. 15 illustrates a system 1500 for reducing interference in RF communications in accordance with another embodiment. This embodiment is based on a distributed Mach-Zehnder interferometer. Aspects of the digital signal processing are similar to the other embodiments (e.g., such as those illustrated in FIG. 7).

The optical layer of the architecture of the system 1500 includes a laser 1502 that is split into two paths by an optical splitter 1504. The two paths 1506 and 1508 are recombined with a second coupler 1510 at which interference occurs.

Each arm 1506 and 1508 includes fiber optic delays that are matched in their latencies. Arm 1508 includes modulator 1 1510 and arm 1506 includes modulator 2 1512. As seen in FIG. 15, modulator 1 1510 is positioned before its associated fiber delay, and modulator 2 1512 is positioned after its associated fiber delay.

In some embodiments, push-pull modulators are used to provide a more efficient modulation action. For example, modulator 1 1510 may apply complimentary modulations to both the upper and lower fibers, and modulator 2 1512 may do the same but with opposite polarity. These may be phase and/or amplitude modulators, for example.

In another embodiment, the distributed Mach-Zehnder optical topology is folded into a Sagnac Topology such that the input and output optical couplers are the same physical device as in FIG. 8. The input may be split into two paths; one traveling counter-clockwise and the other traveling clockwise. The optical modulators used would be traveling wave devices so that they would only apply modulation to light traveling in one of these directions. The counter propagating light fields would recombine and interfere at the coupler 1610. Optical delays would be chosen between the two optical modulators to accommodate the latency through the DSP path as in previous embodiments.

New frequencies may be generated when nonlinear behavior is exhibited by the transmitter, channel, or receiver. These frequencies are either nth order harmonics or intermodulation products (e.g., involving various combinations of sums and differences of the fundamental and/or nth order harmonics).

Most typically, one is concerned with 3rd order intermodulation products because the generated frequencies fall near the original (i.e., fundamental) frequencies. However, higher order harmonics of out-of-band signals can fall in band, particularly when a wideband receiver is used or nonlinearity is introduced by the transmitter or over the channel.

Nonlinear filters can be implemented with polynomial algorithms such as Taylor or Volterra Series Expansions. Generally speaking, these algorithms apply the input signal to weighted nth order polynomials to produce the harmonics and intermodulation products of input signals with the appropriate amplitudes and phases.

A key issue with this type of filtering, however, is the computational complexity involved in implementing these algorithms. This computational complexity infers long latency, which emphasizes the importance of long, low-loss delays afforded by fiber.

In one type of non-linear filtering applications, the systems and methods described herein may contend with off-channel transmitters that generate interference at their harmonics that fall on channel of the protected receiver. These effects can be reversed by sampling the fundamental signal of the problem emitter (e.g., using an antenna), digitally generating the higher order harmonic and/or intermodulation distortion, and then applying the proper amplitude and phase equalization to subtract it from the protected receiver's input. This is a look-behind technique that allows for the recovery of signals that are directly blocked on-channel by harmonics emitted by remote or nearby transmitters.

In another type of non-linear filtering, the systems and methods described herein may compensate for any non-linearity that could arise in the local interference suppression systems and/or the receiver by applying pre-distortion to the DAC outputs. This allows the systems and methods described herein to contend with higher powers without introducing false signals at new frequencies due to distortion in the systems' own components.

The filter weights are chosen so that the pre-distortion can be applied to the optical canceller driving signals. With the proper tuning of weights, non-linearities generated in the systems such as those in the DACs can be cancelled.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. An RF processing system, the system comprising:
   a tap device configured to:
      receive an input signal, and
      split the input signal into a first signal and a second signal;
   a delay module configured to receive and delay the first signal to create a delayed first signal;
   a processing module configured to:
      receive the second signal, and
      create a modulation signal based on the received second signal thereby producing a latency in the modulation signal that matches the delay of the delayed first signal, wherein the modulation signal contains estimates of undesired components; and
   an electro-optical modulation module in operable communication with the delay module and the processing module, wherein the electro-optical modulation module is configured to:
      receive the delayed first signal,
      receive the modulation signal containing estimates of undesired components from the processing module, and
      subtract the estimated undesired components from the delayed first signal to produce a low amplitude signal.

2. The system of claim 1, further comprising:
   a digital signal processor output module configured to digitally combine digitized copies of the low amplitude signal and the modulation signal estimating the high amplitude components to create a high dynamic range version of the input signal.

3. The system of claim 1, wherein the delay module includes an electrical-to-optical converter configured to:
   convert the first signal to a modulated optical signal, and
   hold the modulated optical signal in an optical delay to produce the delayed first signal.

4. The system of claim 3, wherein the electro-optical modulation modulator includes:
   an optical modulator and an optical-to-electrical converter, wherein the optical modulator receives the delayed first signal and the modulation signal and is further configured to modulate the delayed first signal to remove a filtered reference signal to produce a twice-modulated optical signal that is converted to a residual electrical signal output with regulated dynamic range by the optical-to-electrical converter.

5. The system of claim 1, wherein the delay module is optically implemented by at least one of a fiber optic transmitter, a fiber optic delay, and a fiber optic receiver.

6. The system of claim 1, further comprising at least one signal modifier in the delay module for modifying the delayed first signal.

7. An interference cancellation system, the system comprising:
- an first RF processing system configured to receive a first signal, the first RF processing system comprising:
  - a tap device configured to:
    - receive an input signal, and
    - split the input signal into a first signal and a second signal;
  - a delay module configured to receive and delay the first signal to create a delayed first signal;
  - a processing module configured to:
    - receive the second signal, and
    - create a modulation signal based on the received second signal thereby producing a latency in the modulation signal that matches the delay of the delayed first signal, wherein the modulation signal contains estimates of undesired components;
  - an electro-optical modulation module in operable communication with the delay module and the processing module, wherein the electro-optical modulation module is configured to:
    - receive the delayed first signal,
    - receive the modulation signal containing estimates of undesired components from the processing module, and
    - subtract the estimated undesired components from the delayed first signal to produce a low amplitude signal, and
  - a digital signal processor output module configured to digitally combine digitized copies of the low amplitude signal and the modulation signal estimating the high amplitude components to create a high dynamic range version of the input signal;
- at least second RF processing system, comprising the system of claim 2 configured to receive at least one reference signal including interference; and
- a digital signal post processing module configured to:
  - receive the first signal,
  - receive the at least one reference signal including interference, and
  - remove the interference form the first signal.

\* \* \* \* \*